United States Patent
Yase et al.

(10) Patent No.: US 10,572,788 B2
(45) Date of Patent: Feb. 25, 2020

(54) RF TAG

(71) Applicant: OMRON Corporation, Kyoto (JP)

(72) Inventors: Satoshi Yase, Nara (JP); Tetsuya Nosaka, Ibaraki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/102,755

(22) Filed: Aug. 14, 2018

(65) Prior Publication Data

US 2019/0080214 A1 Mar. 14, 2019

(30) Foreign Application Priority Data

Sep. 14, 2017 (JP) ................... 2017-177013

(51) Int. Cl.
*G06K 19/06* (2006.01)
*G06K 19/07* (2006.01)
*G06K 19/077* (2006.01)

(52) U.S. Cl.
CPC ..... *G06K 19/0709* (2013.01); *G06K 19/0715* (2013.01); *G06K 19/0723* (2013.01); *G06K 19/07749* (2013.01)

(58) Field of Classification Search
CPC ........... G06K 19/0709; G06K 19/0715; G06K 19/0723
USPC ........................................................ 235/492
See application file for complete search history.

(56) References Cited

U.S. PATENT DOCUMENTS

| 2008/0266729 | A1 | 10/2008 | Brandl et al. |
| 2014/0093016 | A1 | 4/2014 | Umeda et al. |
| 2016/0004890 | A1 | 1/2016 | Battista et al. |
| 2016/0006369 | A1* | 1/2016 | Zoescher .............. H02M 7/217 455/73 |

FOREIGN PATENT DOCUMENTS

JP   H07111470   4/1995

OTHER PUBLICATIONS

"Search Report of Europe Counterpart Application", dated Feb. 13, 2019, p. 1-p. 6.

* cited by examiner

*Primary Examiner* — Karl D Frech
(74) *Attorney, Agent, or Firm* — JCIPRNET (57) ABSTRACT

An RF tag that includes a limiter and is capable of satisfactorily adjusting an impedance of a matching circuit is provided. The RF tag includes a variable load unit of which an amount of power consumption is changeable and a control unit that is capable of executing an impedance adjusting process of adjusting the impedance of the matching circuit such that an output voltage of a rectification circuit becomes a maximum and executes the impedance adjusting process after reducing the output voltage of the rectification circuit to a voltage less than a limiter voltage by adjusting the amount of power consumption of the variable load unit when a predetermined condition is satisfied.

4 Claims, 9 Drawing Sheets

RF TAG

CROSS-REFERENCE TO RELATED APPLICATION

This application claims the priority benefit of Japan application serial no. 2017-177013, filed on Sep. 14, 2017. The entirety of the above-mentioned patent application is hereby incorporated by reference herein and made a part of this specification.

BACKGROUND

Technical Field

The disclosure relates to an RF tag.

Description of Related Art

In recent years, the development of RF tags has been remarkable, and RF tags are used for mounting wireless electronic components by applying a wireless power transmission function in addition to their original use of object identification. In such applications, electrical loads such as a CPU and a sensor are included as wireless electronic components, and it is preferable to further increase the electric power received by the RF tags such that electric power is stably supplied for operations of such loads. As an RF tag that realizes the effect described above, an RF tag in which a matching circuit having variable impedance (variable impedance circuit) is disposed in a front stage of a rectification circuit is known.

In such an RF tag, in a case in which a deviation of the impedance of the matching circuit from an optimal value is large, an output voltage of the rectification circuit (hereinafter, also expressed as a power supply voltage) may be easily caused to be equal to or less than an operation lower limit voltage of each circuit included in the RF tag in accordance with environmental changes. More specifically, since the impedance of the matching circuit is adjusted to an optimal value, an RF tag having a power supply margin of 7 dB will be considered. Here, a power supply margin is the reduced amount of input power that causes a power supply voltage (the output voltage of the rectification circuit) to be reduced to the operation lower limit voltage in units of dB.

Figure 1A:
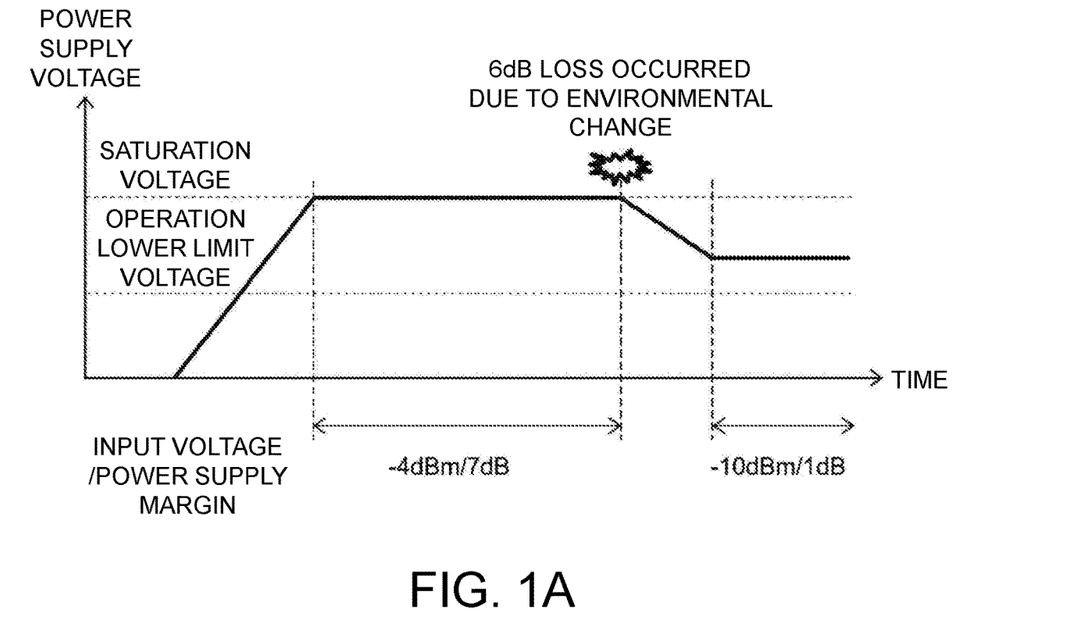
FIG. 1A is an explanatory diagram illustrating change in a pattern of a power supply voltage over time when an environment change occurs in an RF tag in which an impedance of a matching circuit is adjusted to an optimal value.

In a case in which input power to the RF tag drops by 6 dB due to an environmental change (appearance of an obstacle inhibiting the propagation of radio waves toward the antenna, water adhesion to the antenna, or the like), as illustrated in FIG. 1A, the power supply voltage is lowered but not to the operation lower limit voltage. Accordingly, the RF tag continues to operate.

Figure 1B:
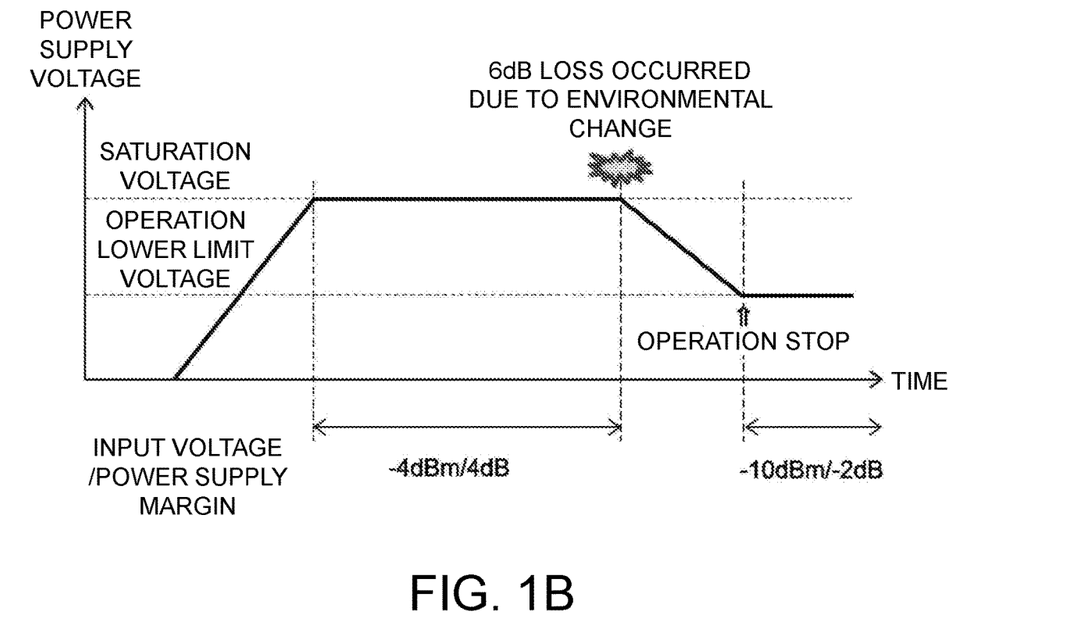
FIG. 1B is an explanatory diagram illustrating a change in a pattern of a power supply voltage over time when an environment change occurs in an RF tag in which an impedance of a matching circuit is not adjusted to an optimal value.

On the other hand, in a case in which the impedance of the matching circuit is not adjusted to an optimal value, and thus, the power supply margin of the RF tag is only 4 dB, as illustrated in FIG. 1B, when the input power drops by 6 dB, the power supply voltage becomes equal to or lower than the operation lower limit voltage. As a result, the RF tag does not operate.

In this way, in a case in which a deviation of the impedance of the matching circuit from the optimal value is large, the power supply voltage may be easily caused to be equal to or lower than the operation lower limit voltage of each circuit included in the RF tag due to environmental change. For this reason, it is preferable to satisfactorily adjust the impedance of the matching circuit included in the RF tag.

Figure 2:
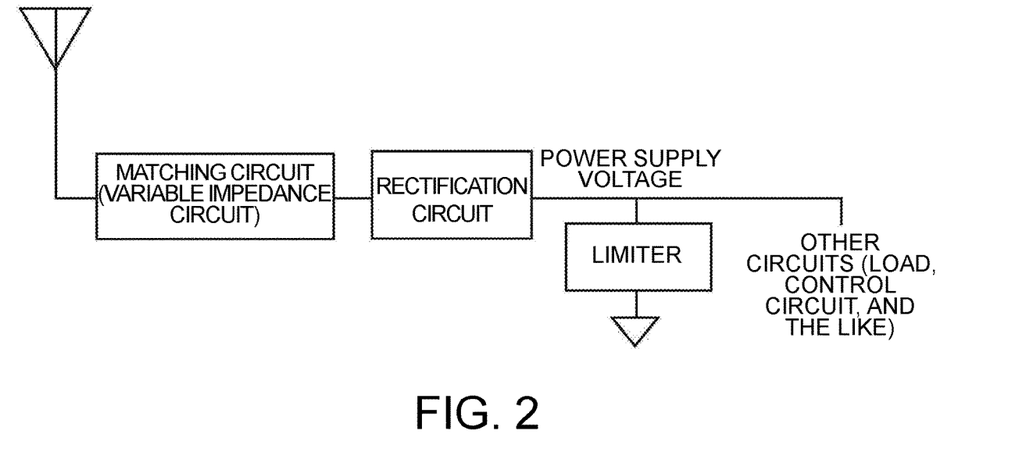
FIG. 2 is a configuration diagram of an RF tag that includes a limiter.

Meanwhile, the impedance of the matching circuit included in the RF tag is, generally, adjusted such that the output voltage of the rectification circuit is maximal (for example, see Japanese Patent Application Laid-open No. H7-111470). In a case in which the output voltage of the rectification circuit can be directly detected, the impedance of the matching circuit can be adjusted to the optimal value using the adjustment process described above. However, as illustrated in FIG. 2, in an RF tag including a limiter that is used for preventing application of an excessive voltage to each circuit or the like, the power supply voltage is limited by the limiter. For this reason, in the adjustment process described above, the impedance of the matching circuit of the RF tag cannot be adjusted to the optimal value.

Figure 3:
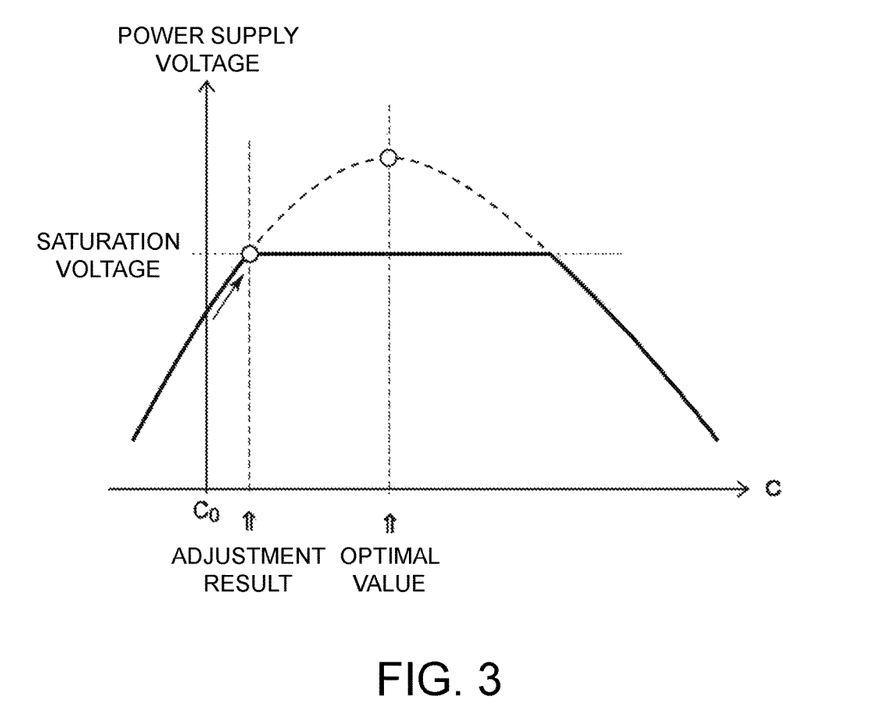
FIG. 3 is a diagram illustrating problems in a conventional adjustment process.

More specifically, as the matching circuit, generally, a circuit (see FIG. 5A) combining two inductors and a variable-capacitance capacitor is employed. In addition, as the adjustment process, generally, a process in which the capacitance C of the variable-capacitance capacitor included in the matching circuit is reduced to a certain value $C_0$, and the capacitance C is increased until the power supply voltage does not change is performed. Accordingly, in a case in which the impedance of the matching circuit of the RF tag including a limiter is adjusted in the adjustment process, as schematically illustrated in FIG. 3, the adjustment of the impedance (the capacitance C of the variable-capacitance capacitor) of the matching circuit ends in a stage in which the power supply voltage rises up to a saturation voltage (limiter voltage), and thus, the impedance of the matching circuit cannot be adjusted to the optimal value.

The disclosure provides an RF tag including a limiter and is capable of satisfactorily adjusting the impedance of a matching circuit.

SUMMARY

According to the disclosure, there is provided an RF tag to which power is wirelessly fed from a reader/writer including: a rectification circuit that rectifies an AC signal supplied from an antenna and outputs a DC voltage supplied to each unit inside the RF tag as a power supply voltage; a limiter that limits the output voltage of the rectification circuit to a predetermined voltage or less; a matching circuit, of which an impedance is changeable, disposed between the antenna and the rectification circuit; a variable load unit, of which an amount of power consumption is changeable, consuming power output from the rectification circuit; and a control unit that is capable of executing an impedance adjusting process of adjusting the impedance of the matching circuit such that the output voltage of the rectification circuit increases and executes the impedance adjusting process after reducing the output voltage of the rectification circuit to a voltage less than the predetermined voltage by adjusting the amount of power consumption of the variable load unit when a predetermined condition is satisfied.

DESCRIPTION OF THE EMBODIMENTS

"An impedance adjusting process of adjusting the impedance of the matching circuit such that the output voltage of the rectification circuit increases" is a process in which more satisfactory adjustment of the impedance can be achieved when the process is performed after the output voltage of the rectification circuit is decreased to a voltage that is not limited by the limiter. The RF tag according to the disclosure has a function of "executing the impedance adjusting process after reducing the output voltage of the rectification circuit to a voltage less than the predetermined voltage by adjusting the amount of power consumption of the variable load unit". Therefore, according to the disclosure, an RF tag including a limiter and is capable of satisfactorily adjusting the impedance of the matching circuit can be realized.

In addition, the variable load unit of the RF tag according to the disclosure may include a variable load for impedance adjustment (for adjustment of the amount of power consumption) and a load (an IC, a sensor, or the like) for the original use of the RF tag or may include only a variable load for impedance adjustment (for adjustment of the amount of power consumption). Furthermore, the "predetermined condition" according to the disclosure may be any condition. More specifically, the "predetermined condition", for example, may be a condition that "a predetermined time has elapsed after previous adjustment of impedance was performed", a condition that "a predetermined direction is input from another device (a reader/writer or the like), or a condition that "the power supply voltage becomes less than the limiter voltage".

The RF tag according to the disclosure may employ a configuration in which "the control unit repeats the process of executing the impedance adjusting process after reducing the output voltage of the rectification circuit to the voltage less than the predetermined voltage by adjusting the amount of power consumption of the variable load unit when the predetermined condition is satisfied until the output voltage of the rectification circuit after the process becomes a voltage less than the predetermined voltage". In addition, the RF tag according to the disclosure may employ a configuration in which "the variable load unit is a unit of which a resistance value is changeable, and the control unit repeats the process of executing the impedance adjusting process after reducing the output voltage of the rectification circuit to the voltage less than the predetermined voltage by adjusting the amount of power consumption of the variable load unit when the predetermined condition is satisfied until the resistance value of the variable load unit after the process becomes a predetermined value or less" or a configuration in which "the control unit repeats the process of executing the impedance adjusting process after reducing the output voltage of the rectification circuit to the voltage less than the predetermined voltage by adjusting the amount of power consumption of the variable load unit when the predetermined condition is satisfied a predetermined number of times or until a predetermined time elapses. By employing such a configuration, an RF tag capable of adjusting the impedance of the matching circuit more satisfactorily is acquired.

According to the disclosure, an RF tag including a limiter and is capable of satisfactorily adjusting the impedance of a matching circuit can be provided.

Hereinafter, an embodiment of the disclosure will be described with reference to the drawings.

Figure 4:
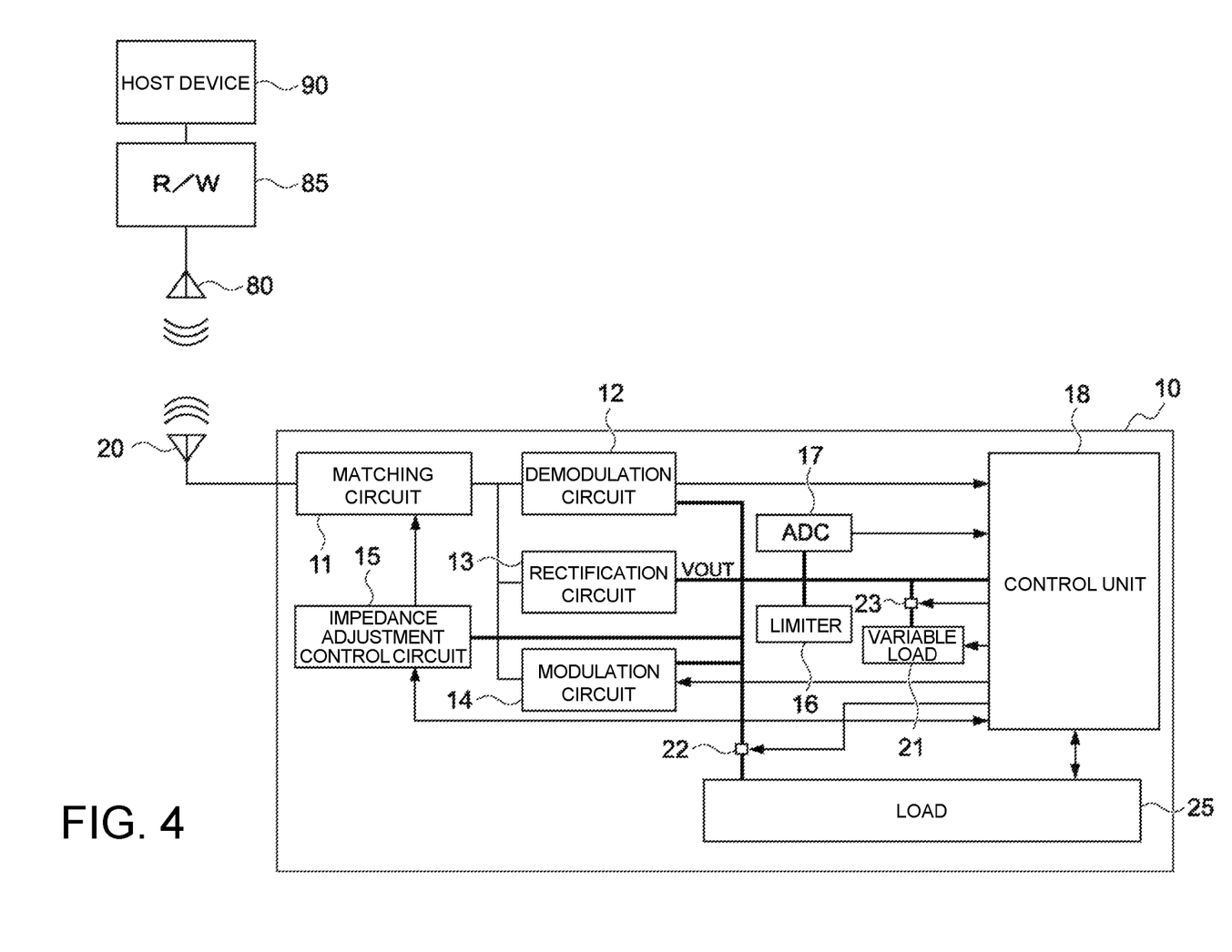
FIG. 4 is an explanatory diagram illustrating the configuration and the use form of an RF tag according to one embodiment of the disclosure.

FIG. 4 illustrates the configuration and the use form of an RF tag 10 according to one embodiment of the disclosure. As illustrated in the drawing, the RF tag 10 includes a matching circuit 11, a demodulation circuit 12, a rectification circuit 13, a modulation circuit 14, an impedance adjustment control circuit 15, a limiter 16, an ADC 17, a control unit 18, a variable load 21, and a load 25.

Figure 5A:
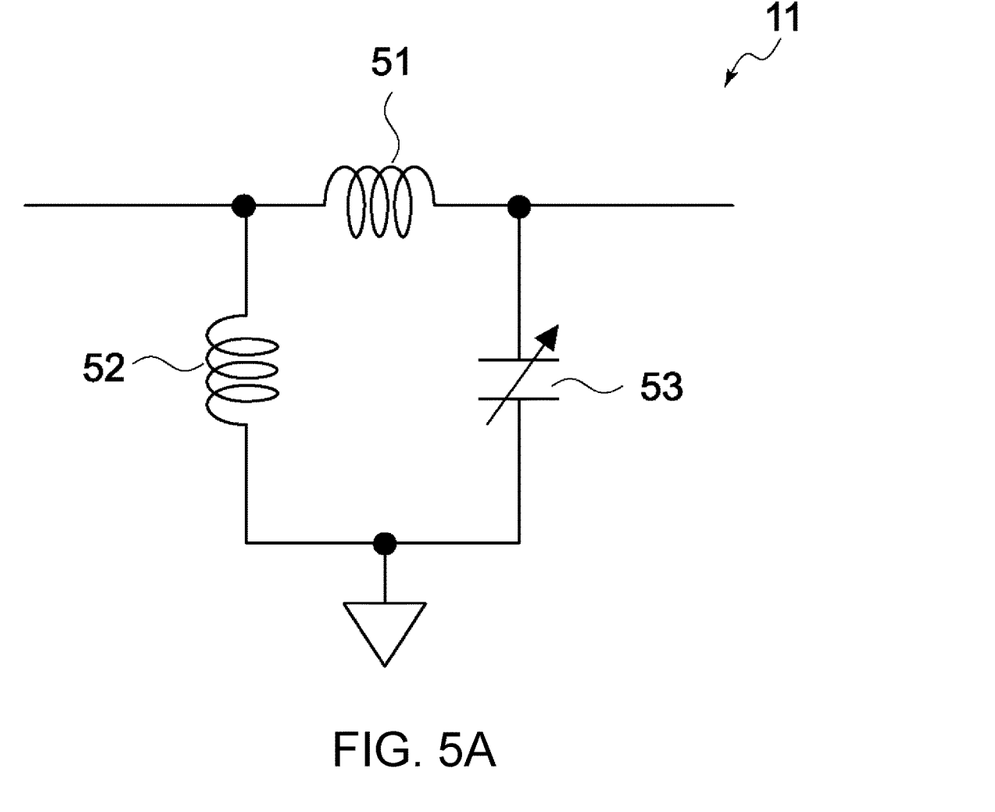
FIG. 5A is an explanatory diagram illustrating the configuration of a matching circuit included in an RF tag.
Figure 5B:
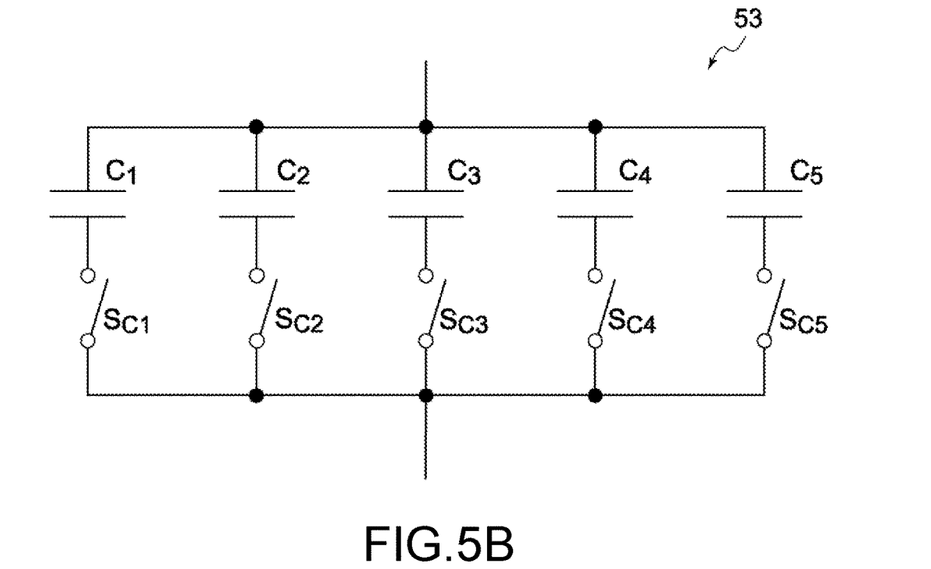
FIG. 5B is an explanatory diagram illustrating the configuration of a variable-capacitance capacitor disposed inside a matching circuit.

The matching circuit 11 is a variable impedance circuit used for impedance matching between an antenna 20 and a circuit disposed inside the RF tag 10. The matching circuit 11 included in the RF tag 10 according to this embodiment, as illustrated in FIG. 5A, is a circuit including two inductors 51 and 52 and a variable-capacitance capacitor 53 of which a capacitance can be changed in accordance with a control signal supplied from the outside. The matching circuit 11 uses a circuit combining capacitors $C_1$ to $C_5$ having mutually-different capacitance values and switches $S_{C1}$ to $S_{C5}$ as illustrated in FIG. 5B as the variable-capacitance capacitor 53. Here, the matching circuit 11 may be a circuit that has a different circuit configuration (for example, a circuit configured such that the capacity of an inductor can be changed) as long as it is a circuit of which an impedance can be changed using a control signal supplied from the outside.

The demodulation circuit 12 (FIG. 4) is a circuit that extracts a command transmitted by a reader/writer (R/W) 85 (host device 90) from a radio wave received by the antenna 20 by demodulating an output of the antenna 20 that is input through the matching circuit 11. The modulation circuit 14 is a circuit that is used for transmitting information to the reader/writer 85 by performing modulation according to the information to be notified to the reader/writer 85 for a reflected wave of a carrier wave transmitted from an antenna 80 of the reader/writer 85.

The rectification circuit 13 is a circuit that generates DC power used for operating each unit (the demodulation circuit 12, the modulation circuit 14, the load 25, and the like) disposed inside the RF tag 10 by rectifying AC power output by the antenna 20 that has received the radio wave. As this rectification circuit 13, for example, a circuit having a configuration illustrated in FIG. 6, in other words, a diode charge pump in which unit rectification circuits $55_1$ to $55_N$ each configured by two diodes (D1 and D2 or the like) and a capacitor C (C1 and C2 or the like) are connected in N stages is used. In addition, the rectification circuit 13 may a circuit that can output a voltage for the load 25 and a voltage for circuits other than the load 25.

The load 25 is an electronic circuit (a sensor, an LED, an IC, a microcomputer, or the like) used by the host device 90 through the reader/writer (R/W) 85. A power supply voltage VOUT is supplied to the load 25 through a first switch 22 of a normally-on type that can be controlled such that it is turned on/off by the control unit 18.

The variable load 21 is a circuit of which the power consumption amount can be changed. The power supply voltage VOUT is supplied to the variable load 21 through a second switch 23 of a normally-off type that can be controlled such that it is turned on/off by the control unit 18. As the variable load 21, for example, a variable resistance circuit of which the resistance value can be changed (designated) using a control signal is used.

The limiter 16 (FIG. 4) is a circuit that limits the output voltage of the rectification circuit 13 to a predetermined voltage (hereinafter, also represented as a limiter voltage VLIM or a saturation voltage) or less. The ADC 17 is an AD converter that digitalizes the output voltage of the rectification circuit 13.

Figure 6:
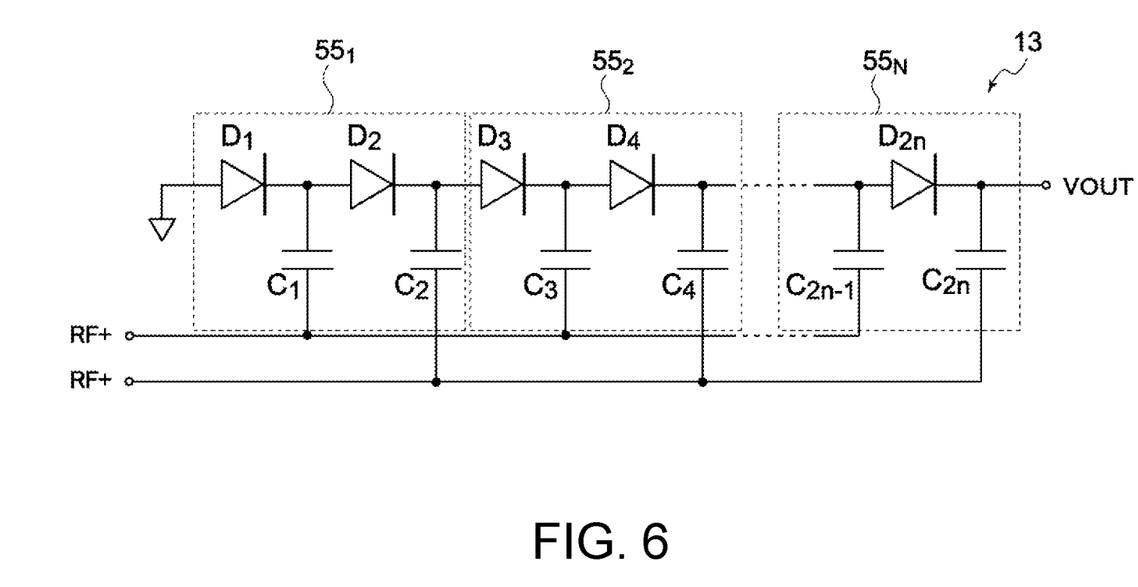
FIG. 6 is a block diagram of a rectification circuit included in an RF tag.

The impedance adjustment control circuit 15 is a circuit that outputs a control signal (in this embodiment, a control signal designating the capacitance of the variable-capacitance capacitor 53 (FIG. 5B)) designating the impedance of the matching circuit 11. In the RF tag 10 according to this embodiment, the impedance adjustment control circuit 15 having the configuration illustrated in FIG. 6 is used.

Although the overall operation of the impedance adjustment control circuit 15 will be described later, an up counter 61 is a counter that clears a count value to "0" when a Reset pulse is input and counts up when an up pulse is input. The counter value of the up counter 61 is used as a control signal designating the impedance (the capacitance of the variable-capacitance capacitor 53 (FIG. 4B)) of the matching circuit 11.

Figure 7:
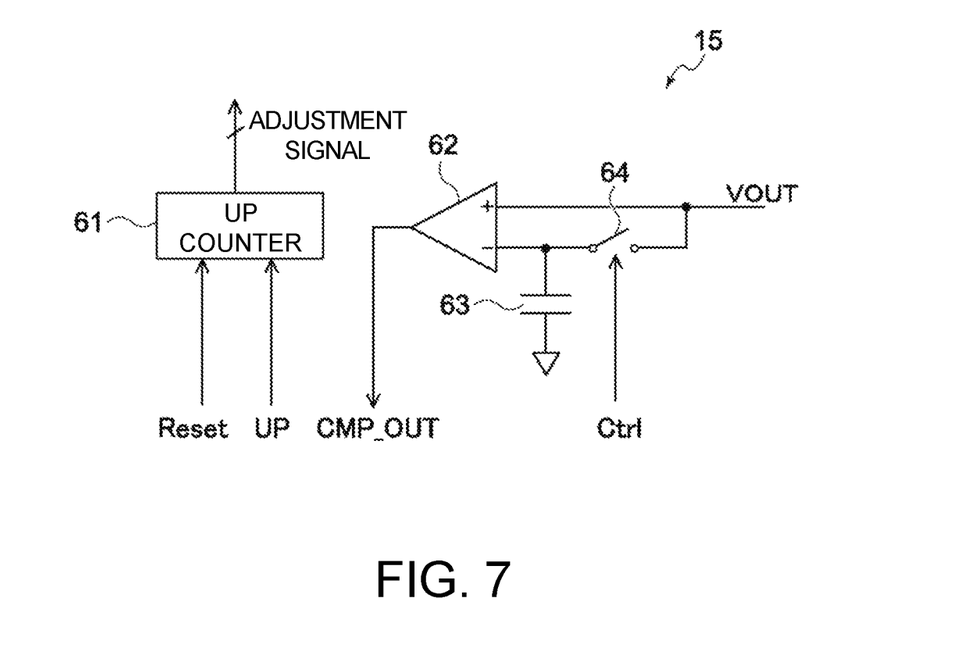
FIG. 7 is an explanatory diagram illustrating the configuration of an impedance adjustment control circuit included in an RF tag.

A comparator 62 is a circuit that outputs a result of comparison between the power supply voltage (the output voltage of the rectification circuit 13) VOUT and the voltage of a capacitor 63. The output of the comparator 62 is input to the control unit 18 through a CMP_OUT signal line. The switch 64 is a switch that is controlled to be turned on/off by the control unit 18 through a Ctrl signal line.

The control unit 18 is a unit, which is configured of a processor (a CPU or the like), responding to a command extracted by the demodulation circuit 12 by controlling the demodulation circuit 14 and the like.

Figure 8:
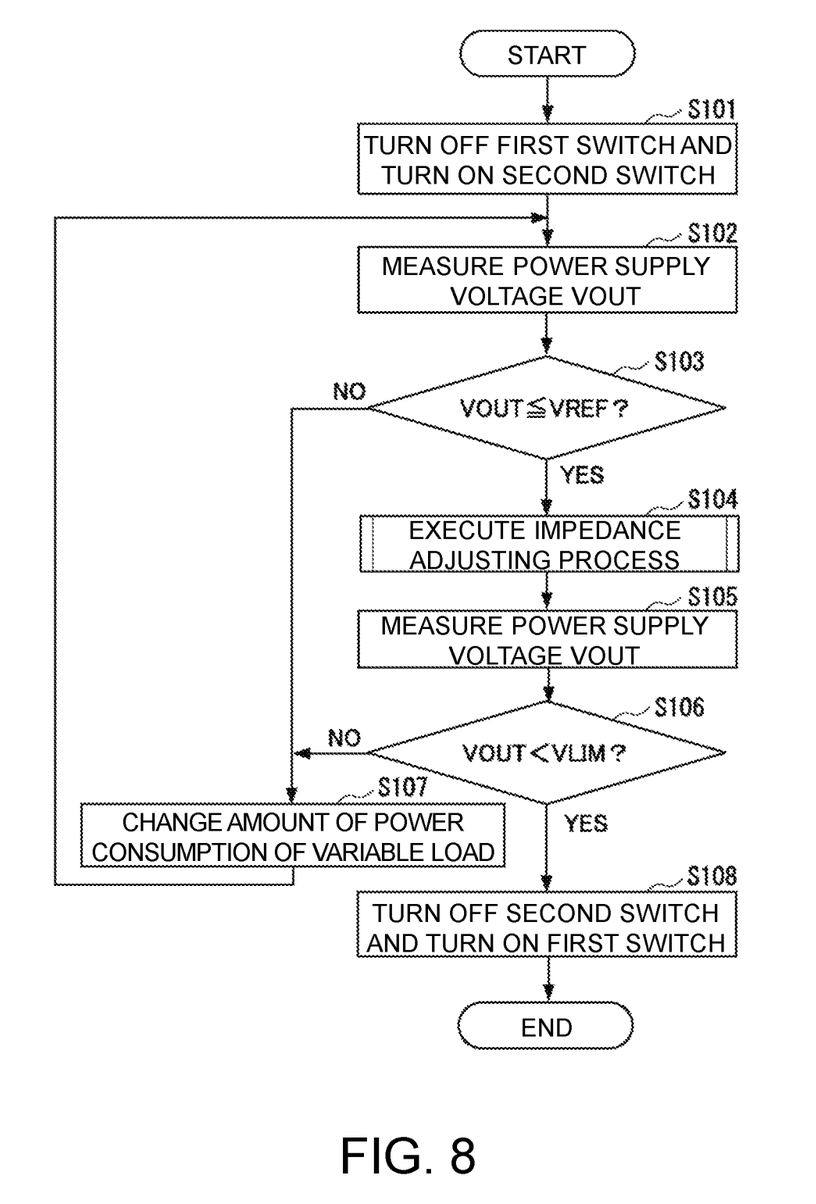
FIG. 8 is a flowchart illustrating an impedance optimization process executed by a control unit disposed in an RF tag.

The control unit 18 is configured (programmed) such that it can execute an impedance optimization process of a flow illustrated in FIG. 8. An execution timing of the impedance optimization process is not particularly limited. Accordingly, for example, the control unit 18 may be configured such that it executes the impedance optimization process when the power supply voltage becomes a threshold value or less, or the control unit 18 may be configured such that it executes the impedance optimization process when the execution of the impedance optimization process is directed from the reader/writer 85.

As illustrated in FIG. 8, when the impedance optimization process is started, the control unit 18, first, performs a process of turning off the first switch 22 and turning on the second switch 23 (Step S101). In other words, the control unit 18 performs a process for stopping supply of power to the load 25 and starting supply of power to the variable load 21.

Next, the control unit 18 measures the power supply voltage VOUT by controlling the ADC 17 (Step S102). Thereafter, the control unit 18 determines whether or not the power supply voltage VOUT is equal to or less than a voltage VREF (Step S103). Here, the voltage VREF is a voltage that is less than the limiter voltage VLIM set in advance.

In a case in which the power supply voltage VOUT is not the voltage VREF or less (Step S103: No), the control unit 18 performs a process of changing the amount of power consumption of the variable load 21 in a direction in which the power supply voltage VOUT reduces (Step S107). In addition, the limiter 16 is disposed in a rear stage of the rectification circuit 13. Thus, there are also cases in which the power supply voltage VOUT does not decrease even when the process of Step S107 is performed.

The control unit 18 that has completed the process of Step S107 executes the process of Step S102 and subsequent steps again. Then, as a result of repeating the process of Steps S102, S103, and S107, the control unit 18 executes the impedance adjusting process (Step S104) in a case in which the power supply voltage VOUT becomes the voltage VREF or less (Step S103: Yes).

Figure 9:
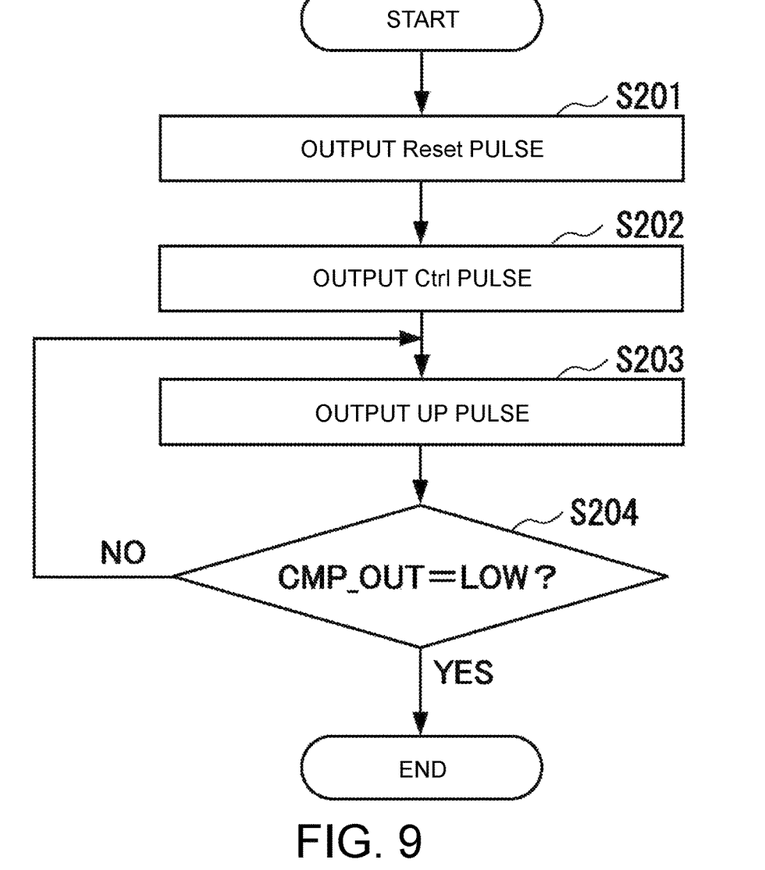
FIG. 9 is a flowchart illustrating an impedance adjusting process executed during the impedance optimization process.

The impedance adjusting process is a process of a flow illustrated in FIG. 9.

In other words, the control unit 18 that has started the impedance adjusting process, first, outputs a Reset pulse (Step S201). Accordingly, the count value of the up counter 61 disposed inside the impedance adjustment control circuit 15 (see FIG. 7) is Reset to "0", and the capacitance of the variable-capacitance capacitor 53 (FIG. 5A) disposed inside the matching circuit 11 is adjusted to the lowest capacitance $C_0$.

Next, the control unit 18 outputs a Ctrl pulse (Step S202). In other words, the control unit 18 causes the voltage (an input voltage input to the "−" terminal of the comparator 62) of the capacitor 63 to coincide with the power supply voltage VOUT at that time point by turning on the switch 64 and then holds the voltage of the capacitor 63 by turning off the switch 64.

Thereafter, the control unit 18 outputs an up pulse (Step S203) and then determines whether or not the output CMP_OUT of the comparator 62 is low (Step S204).

When the up pulse is input, the count value of the up counter 61 is counted up, and accordingly, the capacitance of the variable-capacitance capacitor 53 disposed inside the matching circuit 11 increases. When the capacitance of the variable-capacitance capacitor 53 increases, the power supply voltage increases in a case in which the impedance of the matching circuit 11 does not have an appropriate value and the power supply voltage is not limited by the limiter 16. On the other hand, in a case in which the impedance of the matching circuit 11 has an appropriate value and the power supply voltage is limited by the limiter 16, even when the capacitance of the variable-capacitance capacitor 53 increases, the power supply voltage hardly changes. Thus, in a case in which the output CMP_OUT is low, the adjustment of the impedance of the matching circuit 11 is completed.

However, in a case in which the output CMP_OUT is high, the adjustment of the impedance of the matching circuit 11 is not completed.

For this reason, in a case in which the output CMP_OUT of the comparator 62 is high (Step S204: No), the control unit 18 returns the process to Step S203 and outputs the up pulse again. Then, when the output CMP_OUT of the comparator 62 becomes low (Step S204: Yes), the control unit 18 ends the impedance adjusting process (the process illustrated in FIG. 9).

The description of the impedance optimization process will be continued with reference back to FIG. 8.

The control unit 18 that has ended impedance adjusting process (Step S104) measures the power supply voltage VOUT (Step S105) and determines whether or not the power supply voltage VOUT is less than the limiter voltage VLIM (Step S106). In a case in which the power supply voltage VOUT is not less than the limiter voltage VLIM (Step S106: No), the control unit 18 re-executes the process of Step S102 and subsequent steps.

Then, when the power supply voltage VOUT becomes less than the limiter voltage VLIM during the repetition of the process described above (Step S106: Yes), the control unit 18 performs a process of turning off the second switch 23 and turning on the first switch 22 (Step S108) and then ends this impedance optimization process (the process illustrated in FIG. 8). Although not illustrated in the flowchart (FIG. 8), in a case in which the power supply voltage VOUT is not less than the limiter voltage VLIM, the control unit 18 determines whether or not the amount of power consumption of the variable load 21 at that time point is an upper limit amount. Then, in a case in which the amount of power consumption of the variable load 21 is not the upper limit amount (in other words, in a case in which the amount of power consumption of the variable load 21 can be increased), the control unit 18 causes the process to proceed to Step S107 and increase the amount of power consumption of the variable load 21. On the other hand, in a case in which the amount of power consumption of the variable load 21 is the upper limit amount, the control unit 18 performs the process of Step S108 and then ends this impedance optimization process.

Figure 10:
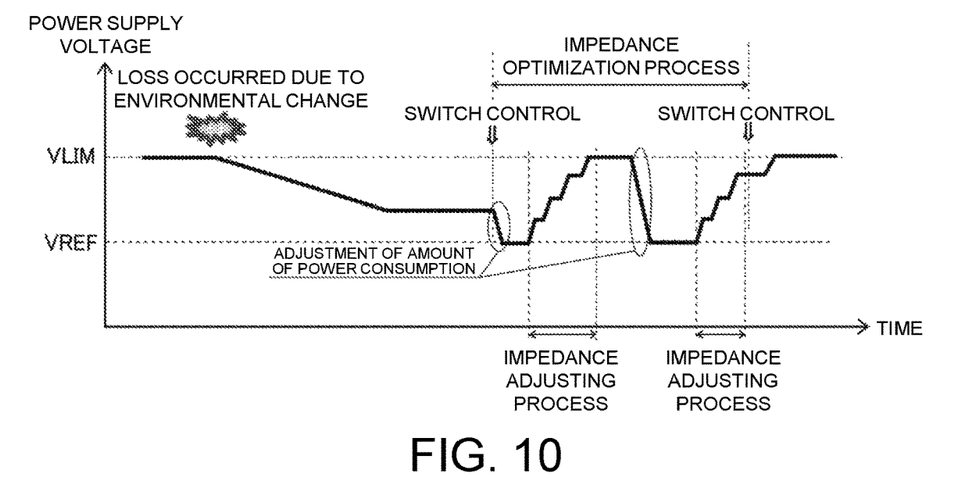
FIG. 10 is an explanatory diagram illustrating an impedance optimization process.

The control unit 18 is configured such that it performs the impedance optimization process of the sequence described above. Thus, in a case in which the impedance optimization process is started in a state in which the power supply voltage VOUT is less than the limiter voltage VLIM, as illustrated in FIG. 10, first, the first switch 22 and the second switch 23 are controlled such that a state is formed in which power is not supplied to the load 25, and power is supplied to the variable load 21. Next, in accordance with adjustment of the amount of power consumption of the variable load 21, the power supply voltage VOUT is reduced to the voltage VREF. Then, after the impedance adjusting process is performed, it is determined whether or not the power supply voltage VOUT after the impedance adjusting process is less than the limiter voltage VLIM.

In a case in which the power supply voltage VOUT after the impedance adjusting process is not less than the limiter voltage VLIM, as illustrated in FIG. 10, again, the power supply voltage VOUT is reduced to the voltage VREF in accordance with adjustment of the amount of power consumption of the variable load 21. Thereafter, the impedance adjusting process is performed. Then, it is determined whether or not the power supply voltage VOUT after the impedance adjusting process is less than the limiter voltage VLIM. In a case in which the power supply voltage VOUT is less than the limiter voltage VLIM, the first switch 22 and the second switch 23 are controlled such that the state is returned to the original state in which power is not supplied to the variable load 21, and power is supplied to the load 25, and the impedance optimization process ends.

Figure 11:
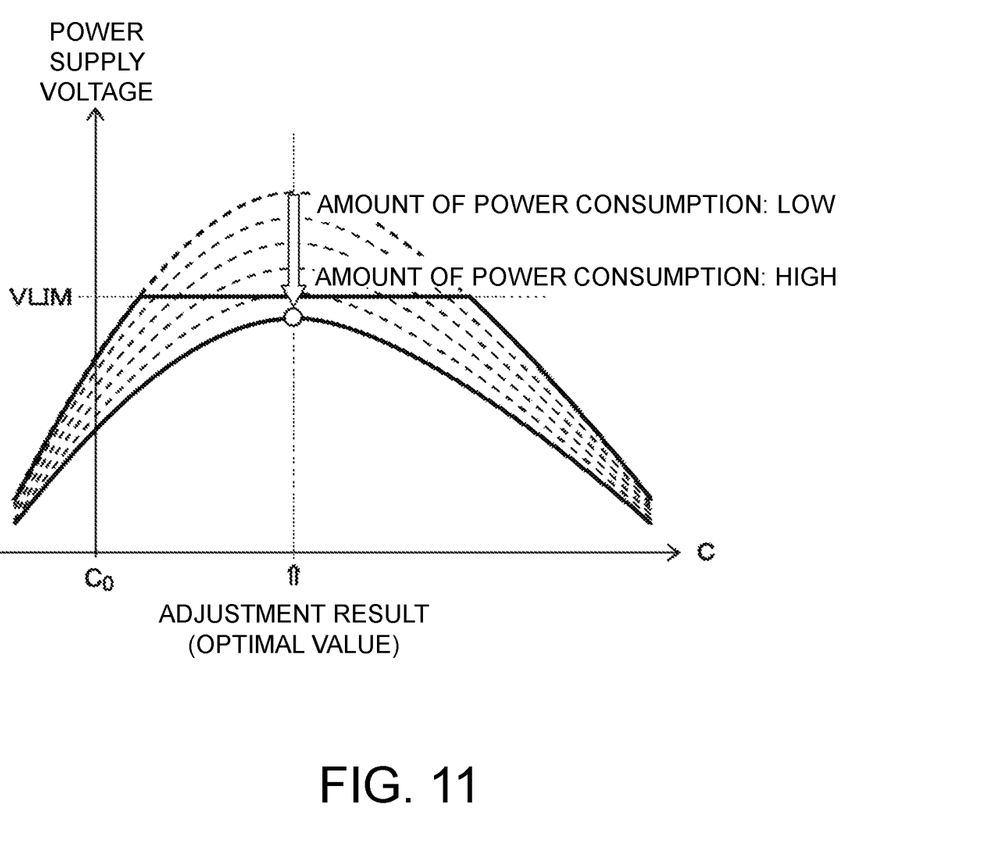
FIG. 11 is a diagram illustrating a reason why the impedance of a matching circuit can be adjusted to an optimal value using an impedance optimization process.

The power supply voltage after the impedance adjusting process being less than the limiter voltage VLIM represents that the impedance of the matching circuit 11 has an optimal value. More specifically, as illustrated in FIG. 11, a power supply voltage-capacitance curve (broken line) of a case in which the limiter 16 is not disposed represents that a peak voltage changes to a lower side in accordance with an increase in the amount of power consumption of the variable load 21. The impedance adjusting process (FIG. 8) is a process of adjusting the capacitance of the variable-capacitance capacitor 53 to a capacitance for which the power supply voltage is a maximum. Accordingly, in a case in which the power supply voltage after the impedance adjusting process is less than the limiter voltage VLIM, the impedance of the matching circuit 11 has an optimal value.

As described above, the RF tag 10 according to this embodiment has a function of adjusting the impedance of the matching circuit 11 to an optimal value. Accordingly, by using the RF tag 10, a radio communication system that is robust with respect to environmental changes, in other words, a radio communication system in which it is difficult for an obstacle to occur in communication with the reader/writer 85 even when power input to the RF tag 10 is reduced in accordance with environmental changes can be built.

<Modified Forms>

Various modifications can be made in the RF tag 10 according to the embodiment described above. For example, in a case in which there is a unit of which the amount of power consumption can be adjusted relatively finely among power supply targets in the RF tag 10 (the load 25, the control unit 18, the demodulation circuit 12, the modulation circuit 14, the impedance adjustment control circuit 15, and the like), the RF tag 10 may be modified into a device in which the variable load 21 is not included, and the unit described above is used as the variable load 21. In addition, the RF tag 10 may be modified into a device not including the first switch 22 and/or the second switch 23. Furthermore, in a case in which the RF tag 10 is modified into a device not including the second switch 23, a process of adjusting the power consumption of the variable load 21 to "0" (or minimum power consumption) may be performed in Step S108.

The RF tag 10 may be modified to a multi-level comparator comparing the power supply voltage VOUT with the voltage VREF and comparing the power supply voltage VOUT with the limiter voltage VLIM instead of the ADC 17. In addition, the RF tag 10 may be modified into a device that includes a comparator comparing the power supply voltage VOUT with the voltage VREF and a comparator comparing the power supply voltage VOUT with the limiter voltage VLIM instead of the ADC 17.

Furthermore, a function for executing a second impedance adjusting process (an impedance adjusting process in which the process of Step S101 is not performed) starting adjustment of the impedance of the matching circuit 11 from the impedance at that time point may be included in the RF tag 10, and the impedance optimization process may be changed to the process in which the second impedance adjusting process is performed in the second and subsequent Step S105.

The impedance optimization process (FIG. 8) may be modified to a process in which the process of Step S106 is not performed, that is, a process in which, after the power supply voltage VOUT is reduced to a voltage less than the limiter voltage VLIM (a voltage that is VREF or less), the impedance adjusting process is performed only once. The condition for ending the impedance optimization process may be changed to a condition other than "VOUT<VLIM", for example, "the number of times of execution of the impedance adjusting process<a predetermined number of times" or "an execution time of the impedance optimization process (an elapsed time after the start of the impedance optimization process)<a predetermined number of times". In addition, in a case in which a condition of not using the power supply voltage VOUT is used as the condition for ending the impedance optimization process, a comparator comparing the power supply voltage VOUT with the voltage VREF may be used instead of the ADC 17.

When the condition for ending the impedance optimization process is changed to the condition described above, the impedance of the matching circuit 11 may not be adjusted to the optimal value in some cases. Even in a case in which the condition for ending the impedance optimization process is changed to the condition described above, the impedance of the matching circuit 11 can be adjusted more satisfactorily than in a conventional case (a form in which a result of the adjustment of the impedance is closer to the optimal value than that of the conventional case).

While the impedance adjusting process described above is a process in which the capacitance of the variable-capacitance capacitor 53 for which the impedance of the matching circuit 11 has an optimal value (hereinafter, referred to as optimal capacitance) is retrieved through a linear search of monotonously increasing the capacitance of the variable-capacitance capacitor 53 (FIG. 5A), the impedance adjusting process may be a process in which an optimal capacitance of the variable-capacitance capacitor 53 is retrieved through a linear search monotonously reducing the capacitance of the variable-capacitance capacitor 53. In addition, the impedance adjusting process may be a process of retrieving the optimal capacitance of the variable-capacitance capacitor 53 using another search algorithm such as a binary search or a tree search. Also in an impedance adjusting process of an RF tag 10 in which the matching circuit 11 is a circuit of which the impedance can be adjusted by changing the capacity of an inductor, similarly, a process using various search algorithms may be employed.

A function of monitoring the power supply voltage VOUT being a predetermined voltage, which is less than the voltage VLIM, or less and performing an impedance adjusting process when the power supply voltage VOUT becomes the predetermined voltage or less may be given to the RF tag 10. In addition, the RF tag 10 may be modified into a device, which has the function described above, not performing the impedance optimization process.

What is claimed is:

1. An RF tag to which power is wirelessly fed from a reader/writer, the RF tag comprising:
    a rectification circuit that rectifies an AC signal supplied from an antenna and outputs a DC voltage supplied to each unit inside the RF tag as a power supply voltage;
    a limiter that limits the output voltage of the rectification circuit to a predetermined voltage or less;
    a matching circuit, of which an impedance is changeable, disposed between the antenna and the rectification circuit;
    a variable load unit, of which an amount of power consumption is changeable, consuming power output from the rectification circuit; and
    a control unit that is capable of executing an impedance adjusting process of adjusting the impedance of the matching circuit such that the output voltage of the rectification circuit increases and executes the impedance adjusting process after reducing the output voltage of the rectification circuit to a voltage less than the predetermined voltage by adjusting the amount of power consumption of the variable load unit when a predetermined condition is satisfied.

2. The RF tag according to claim 1, wherein the control unit repeats the process of executing the impedance adjusting process after reducing the output voltage of the rectification circuit to the voltage less than the predetermined voltage by adjusting the amount of power consumption of the variable load unit when the predetermined condition is satisfied until the output voltage of the rectification circuit after the process becomes a voltage less than the predetermined voltage.

3. The RF tag according to claim 1, wherein the variable load unit is a unit of which a resistance value is changeable, and the control unit repeats the process of executing the impedance adjusting process after reducing the output voltage of the rectification circuit to the voltage less than the predetermined voltage by adjusting the amount of power consumption of the variable load unit when the predetermined condition is satisfied until the resistance value of the variable load unit after the process becomes a predetermined value or less.

4. The RF tag according to claim 1, wherein the control unit repeats the process of executing the impedance adjusting process after reducing the output voltage of the rectification circuit to the voltage less than the predetermined voltage by adjusting the amount of power consumption of the variable load unit when the predetermined condition is satisfied for a predetermined number of times or until a predetermined time elapses.

* * * * *